US011827466B2

(12) United States Patent
DeWind et al.

(10) Patent No.: US 11,827,466 B2
(45) Date of Patent: Nov. 28, 2023

(54) DOUBLE AUGER METERING APPARATUS

(71) Applicant: One Pass Innovators, LLC, Zeeland, MI (US)

(72) Inventors: Ryan DeWind, Zeeland, MI (US); Gregory Allen DeWind, Zeeland, MI (US)

(73) Assignee: One Pass Innovators, LLC, Zeeland, MI (US)

( * ) Notice: Subject to any disclaimer, the term of this patent is extended or adjusted under 35 U.S.C. 154(b) by 0 days.

(21) Appl. No.: 17/558,420

(22) Filed: Dec. 21, 2021

(65) Prior Publication Data

US 2022/0194720 A1    Jun. 23, 2022

Related U.S. Application Data

(60) Provisional application No. 63/128,533, filed on Dec. 21, 2020.

(51) Int. Cl.
*B65G 65/46* (2006.01)
*B65G 33/10* (2006.01)
(Continued)

(52) U.S. Cl.
CPC .............. *B65G 65/46* (2013.01); *B65G 33/10* (2013.01); *B65G 33/14* (2013.01); *B65G 33/32* (2013.01);
(Continued)

(58) Field of Classification Search
CPC ........ B65G 65/46; B65G 33/10; B65G 33/14; B65G 33/32; B65G 33/34; B65G 43/08;
(Continued)

(56) References Cited

U.S. PATENT DOCUMENTS 3,858,759 A * 1/1975 Lubenow ............... D01G 23/06
222/55
4,344,580 A * 8/1982 Hoshall ................. B65G 65/46
366/322
(Continued)

FOREIGN PATENT DOCUMENTS

CN     205917572     * 2/2017
CN     207987061     * 10/2018
(Continued)

*Primary Examiner* — Bob Zadeh
(74) *Attorney, Agent, or Firm* — The Watson IP Group, PLC; Jovan N. Jovanovic

(57) ABSTRACT

An apparatus comprises a hopper housing, a first auger, a second auger, a dividing panel, and a motor. The hopper housing holds a bulk material, with the hopper housing including a first end at which the bulk material is added to the hopper housing and a second end comprising a discharge opening at which the bulk material exits the hopper housing. The first auger is disposed proximate to the discharge opening. The second auger is disposed between the first end of the hopper housing and the first auger. The dividing panel is disposed between the first auger and the second auger and the dividing panel is coupled to the hopper housing at the first side thereof and forming a panel opening between the hopper housing and the second side thereof. The motor rotates the first auger and the second auger to move the bulk material into the discharge opening.

20 Claims, 13 Drawing Sheets

(51) Int. Cl.
*B65G 33/14* (2006.01)
*B65G 33/32* (2006.01)
*B65G 69/20* (2006.01)
*B65G 43/08* (2006.01)
*G01F 13/00* (2006.01)
*B65G 33/34* (2006.01)

(52) U.S. Cl.
CPC ............. *B65G 33/34* (2013.01); *B65G 43/08* (2013.01); *B65G 69/20* (2013.01); *G01F 13/005* (2013.01); *B65G 2203/0208* (2013.01)

(58) Field of Classification Search
CPC ............ B65G 69/20; B65G 2203/0208; G01F 13/005
See application file for complete search history.

(56) References Cited

U.S. PATENT DOCUMENTS

| | | | | |
|---|---|---|---|---|
| 4,875,820 | A * | 10/1989 | Lepp | B65G 33/32 198/615 |
| 2013/0092509 | A1 * | 4/2013 | Hall | A01C 15/003 198/581 |
| 2015/0361775 | A1 * | 12/2015 | Pham | B01F 35/71775 166/305.1 |
| 2017/0349379 | A1 * | 12/2017 | DeWind | B65G 33/14 |
| 2022/0194720 | A1 * | 6/2022 | DeWind | B65G 33/34 |

FOREIGN PATENT DOCUMENTS

| | | | |
|---|---|---|---|
| CN | 109364823 | * | 2/2019 |
| CN | 208572747 | * | 3/2019 |
| CN | 208972633 | * | 6/2019 |
| CN | 110419976 | * | 11/2019 |
| CN | 111234852 | * | 6/2020 |

\* cited by examiner

DOUBLE AUGER METERING APPARATUS

CROSS-REFERENCE TO RELATED APPLICATION

This application claims priority from U.S. Provisional Patent Application Ser. No. 63/128,533 filed on Dec. 21, 2020, entitled "DOUBLE AUGER METERING APPARATUS", the entire disclosure of which is hereby incorporated by reference in its entirety.

BACKGROUND OF THE DISCLOSURE

1. Field of the Disclosure

The disclosure relates in general to an auger apparatus, and more particularly, to a double auger metering apparatus.

2. Background Art

Large quantities of bulk material, e.g., powdered, are used in many industrial applications. In many of these industrial applications, this bulk material must be accurately metered to maintain a ratio between the bulk material and another material, particular when this powdered material is combined with this another material. Typically, such metering includes a volumetric screw feeder, a circle feeder, a disc feeder, weigh chain feeder, volumetric wheel feeder, etc. One such application of an industrial bulk material metering apparatus is for an industrial trencher.

SUMMARY OF THE DISCLOSURE

The disclosure is directed to an apparatus comprising a hopper housing, a first auger, a second auger, a dividing panel, and a motor. The hopper housing holds a bulk material, the hopper housing including a first end at which the bulk material is added to the hopper housing and a second end comprising a discharge opening at which the bulk material exits the hopper housing. The first auger is disposed proximate to the discharge opening. A second auger disposed between the first end of the hopper housing and the first auger, the second auger being substantially parallel to the first auger. The dividing panel includes a first side and a second side, with the dividing panel being disposed between the first auger and the second auger and the dividing panel being coupled to the hopper housing at the first side thereof and forming a panel opening between the hopper housing and the second side thereof. The motor rotates the first auger and the second auger, with the bulk material being moved by the rotating second auger into the panel opening and the bulk material being moved by the rotating first auger into the discharge opening of the hopper housing.

In some configurations, the apparatus further comprises a transmission coupled to the first auger and the second auger, the transmission transferring a torque produced by the motor to the first auger and the second auger.

In some configurations, the transmission includes a first toothed sprocket coupled to the first auger, a second toothed sprocket coupled to the second auger, a third toothed sprocket coupled to a drive shaft of the motor, and a chain coupled to the first toothed sprocket, the second toothed sprocket, and the third toothed sprocket.

In some configurations, the apparatus further comprises a grate disposed between the first end of the hopper housing and the second auger, the grate being substantially a same dimension as the first end of the hopper housing.

In some configurations, the first end and second end are polygonal in shape.

In some configurations, the polygonal shape is a square.

In some configurations, the apparatus further comprises a bag-stop disposed proximate to the first end of the hopper housing, the bag-stop to puncture a bulk material bag storing the bulk material placed into the hopper housing, the puncture to allow the bulk material to fall into the second auger.

In some configurations, the bag-stop includes a crescent shaped member coupled to the hopper housing via four bracing members disposed around a perimeter of the crescent shaped member.

In some configurations, the hopper housing further includes a first side and a second side, the second auger being disposed proximate to the second side and the hopper housing further comprising a slanted panel slanted downward from the first side toward the second side to direct the bulk material toward the second auger.

In some configurations, the hopper housing further includes a first side and a second side, the second auger being disposed proximate to the second side and the hopper housing further comprising a slanted panel coupled to the second side and slanted toward the second auger to direct the bulk material toward the second auger.

In some configurations, a volume window is disposed within the hopper housing, the volume window to allow a determination of the volume of the bulk material within the hopper housing.

In some configurations, the apparatus further comprises a frame coupled to the hopper housing, the frame supporting the hopper housing to stand in an upright orientation on the second end.

In some configurations, the apparatus further comprises a plurality of mounting tabs disposed along a perimeter of the first end.

In some configurations, the first auger is approximately in-line with the discharge opening and the second auger is offset with respect to the discharge opening.

In some configurations, the bulk material is comprised of Bentonite.

In some configurations, a system comprises the apparatus, the system further comprising a feeder controller coupled to the motor and a discharge sensor disposed proximate to the discharge opening and the coupled to the hopper housing, the discharge sensor sensing a volume of the bulk material exiting the hopper housing and the feeder controller controlling a speed at which the motor turns the first auger and the second auger based on the sensed volume of the bulk material exiting the hopper housing to control the volume of the bulk material exiting the discharge opening of the hopper housing.

In some configurations, a system comprises the apparatus, the system further comprising a pressurizing apparatus to positively pressurize the hopper housing to push the bulk material into the second auger.

In some configurations, a system comprises the apparatus, the system further comprising a trencher to dig a trench along a soil into which the bulk material is added to the soil.

In some configurations, the apparatus is coupled to a front of the trencher proximate to blades of the trencher.

In some configurations, a system comprises the apparatus, the system further comprising a mixing station including a first hose and a second hose, the first hose to receive a mixing agent by the mixing station and the second hose to deliver a mixture of the bulk material and the mixing agent to a trencher.

BRIEF DESCRIPTION OF THE DRAWINGS

The disclosure will now be described with reference to the drawings wherein.

DETAILED DESCRIPTION OF THE DISCLOSURE

Figure 1:
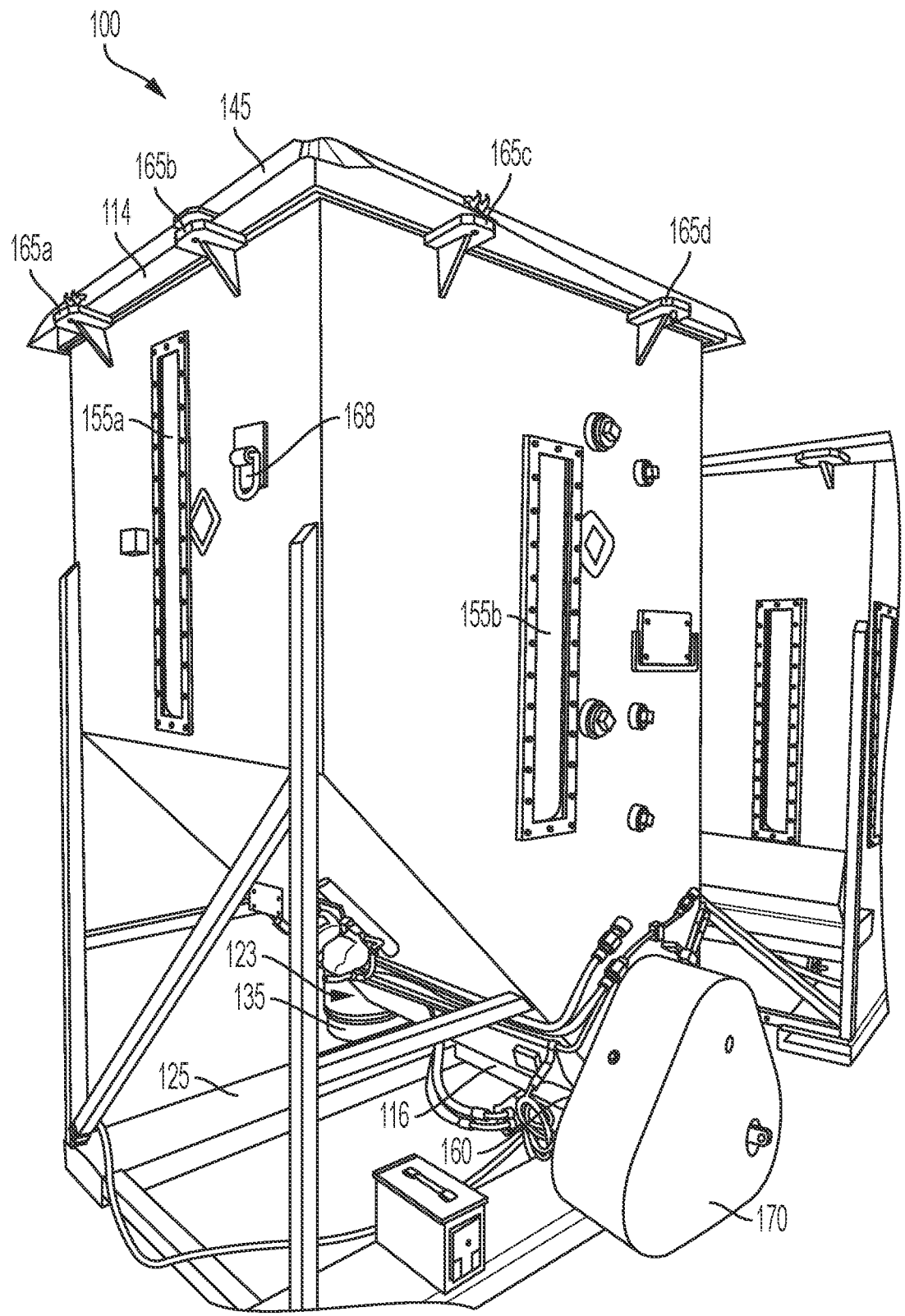
FIG. 1 of the drawings illustrates an isometric view of an example double auger metering apparatus of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, an apparatus, such as an example double auger metering apparatus 100, is shown. In at least one embodiment, the double auger metering apparatus 100 can be constructed from metal, such as steel, aluminum, cast metal, or any other material that is strong enough to a bulk material 212 (FIG. 2) within. Although the double auger metering apparatus 100 is shown as including two augers for metering a quantity of the bulk material 212, a first auger 220 and a second auger 230, the double auger metering apparatus 100 can include additional augers (not shown) without departing from the scope of the embodiments disclosed. For example, an additional auger (not shown) can be utilized within a discharge opening 123 of the double auger metering apparatus 100 to further meter delivery of the bulk material 212, without departing from the scope of the embodiments.

The double auger metering apparatus 100 includes a hopper housing 110, a first auger 220, a second auger 230, a dividing panel 240, and a motor 260. The hopper housing 110 holds the bulk material 212. The hopper housing 110 includes a first end 114, shown at a top of the hopper housing 110, at which the bulk material 212 is added to the hopper housing 110 and a second end 116, shown at a bottom of the hopper housing 110, comprising the discharge opening 123 at which the bulk material 212 exits the hopper housing 110. In at least one embodiment, the first end 114 and second end 116 are polygonal in shape, such as square. In other embodiments, the first end 114 and second end 116 are other shapes, such as rectangular, oval, circular, or any other shape that can accommodate the first auger 220 and the second auger 230.

In at least one embodiment, a cap 135 can be used to cover the discharge opening 123 when the double auger metering apparatus 100 is not being utilized. This cap 135 prevents any of the bulk material 212 that remains in the hopper housing 110 from escaping the hopper housing 110 and further prevents any outside contaminates, such as water, from entering the hopper housing 110 when the double auger metering apparatus 100 is not being utilized. Similarly, a cover 145 is used to cover the first end 114 of the hopper housing 110 to prevent outside contaminants, such as water, from falling into the hopper housing 110 when the double auger metering apparatus 100 is not being utilized.

The first auger 220 is disposed proximate to the discharge opening 123. A long axis 221 of the first auger 220 and a long axis 222 of the second auger 230 run substantially perpendicular (+−7%) to the discharge opening 123. Ends of the first auger 220 are disposed in holes within the hopper housing 110 such that the first auger 220 is free to rotate about the long axis 221 of the first auger 220. The second auger 230 is disposed between the first end 114 of the hopper housing 110 and the first auger 220, the second auger 230 being substantially parallel (+−7%) to the first auger 220. Ends of the second auger 230 are likewise disposed in holes within the hopper housing 110 such that the second auger 230 is free to rotate about the long axis 222 of the second auger 230. In other embodiments, ends of the first auger 220 and the second auger 230 are disposed within brackets (not shown) coupled to an inside surface of the hopper housing 110, these brackets allowing the first auger 220 and the second auger 230 to rotate freely about their long axis 221/222, respectively.

The dividing panel 240 includes a first side 242 and a second side 244. The dividing panel 240 is parallel to and disposed between the first auger 220 and the second auger 230, with the dividing panel 240 further being coupled to the hopper housing 110 at the first side 242 thereof. The dividing panel 240 forms a panel opening 250 between the hopper housing 110 and the second side 244 thereof. A bottom panel 245 is disposed on an opposite of the second auger 230 as the dividing panel 240.

As shown, the first auger 220, the second auger 230, the dividing panel 240, and the bottom panel 245 are positioned with respect to each other to minimize spacing between the first auger 220 and the dividing panel 240, and between the dividing panel 240, the second auger 230, and the bottom panel 245. This minimized space prevents the bulk material 212 from easily moving past the first auger 220 and the second auger 230, unless the first auger 220 and the second auger 230 are rotating to move the bulk material 212 along a path that includes the rotating second auger 230 through the panel opening 250, then along the rotating first auger 220, and finally into the discharge opening 123 of the hopper housing 110. This minimized space allows more precise control over a volume of the bulk material 212 that exits the double auger metering apparatus 100 via the discharge opening 123 of the hopper housing 110. The motor 260 (e.g., an electric motor, a hydraulic motor, a pneumatic motor, or any other type of force generating device that can rotate the first auger 220 and the second auger 230, such as an engine) rotates the first auger 220 and the second auger 230 to move the bulk material 212 within the hopper housing 110.

In at least one embodiment, a transmission 170 is coupled to the first auger 220 and the second auger 230. The transmission 170 transfers a torque produced by the motor 260 to the first auger 220 and the second auger 230. In at least one embodiment, the transmission 170 includes a first toothed sprocket 271 coupled to the first auger 220, a second toothed sprocket 272 coupled to the second auger 230, a third toothed sprocket 273 coupled to a drive shaft 274 of the motor 260, and a chain 275 to couple the first toothed sprocket 271, the second toothed sprocket 272, and the third toothed sprocket 273. The motor 260 rotates the third toothed sprocket 273 which in turn rotates the chain 275. The rotating chain 275 in turn rotates both the first toothed sprocket 271 and the second toothed sprocket 272, to respectively rotate the first auger 220 and the second auger 230. Thus, a rotational force from the motor 260 is applied to the first auger 220 and the second auger 230 via the rotating chain 275.

In at least one embodiment, the double auger metering apparatus 100 further comprises a volume window 155 disposed within the hopper housing 110. This volume window 155 allows a user to determine the volume of the bulk material 212 within the hopper housing 110. In the example shown in FIG. 1, the double auger metering apparatus 100 includes a plurality of volume windows 155, such as the illustrated volume window 155a and volume window 155b that are disposed on neighboring sides of the double auger metering apparatus 100. The double auger metering apparatus 100 can further include two additional volume windows 155 (not shown) on sides of the double auger metering apparatus 100 not visible in FIG. 1. With volume windows 155 disposed on all four sides of the double auger metering apparatus 100, a user can view a volume of the bulk material 212 within the hopper housing 110 from any side thereof.

In at least one embodiment, the volume window 155 is an elongated rectangular window that allows a user to view the volume of the bulk material 212 between approximately a location of the second auger 230 and a location proximate to the first end 114 of the hopper housing 110. In other embodiments, the volume window 155 can be oval, rectangular, square, or any other shape that allows a user to view a volume of the bulk material 212 within the hopper housing 110. In at least one embodiment, the double auger metering apparatus 100 further includes a frame 125 coupled to the hopper housing 110. This frame 125 includes various cross members to form a level surface at the second end 116 of the hopper housing 110. The frame 125 supports the hopper housing 110 to stand in an upright orientation on the second end 116. This frame 125 is particularly useful in storing the double auger metering apparatus 100 in an upright orientation when not in use.

In at least one embodiment, the double auger metering apparatus 100 is part of a system, such as a system 101 that includes the double auger metering apparatus 100, a feeder controller 280, and a discharge sensor 290. The feeder controller 280 is coupled to the motor 260 and the discharge sensor 290. The discharge sensor 290 is disposed proximate to the discharge opening 123 and coupled to the hopper housing 110. The discharge sensor 290 senses a volume of the bulk material 280 exiting the hopper housing 110, such as via the discharge opening 123. The feeder controller 280 controls a speed at which the motor 260 turns the first auger 220 and the second auger 230 based on the sensed volume of the bulk material 280 exiting the hopper housing 110. In this way, the feeder controller 280 controls the volume of the bulk material 212 exiting the discharge opening 123 of the hopper housing 110.

Figure 2:
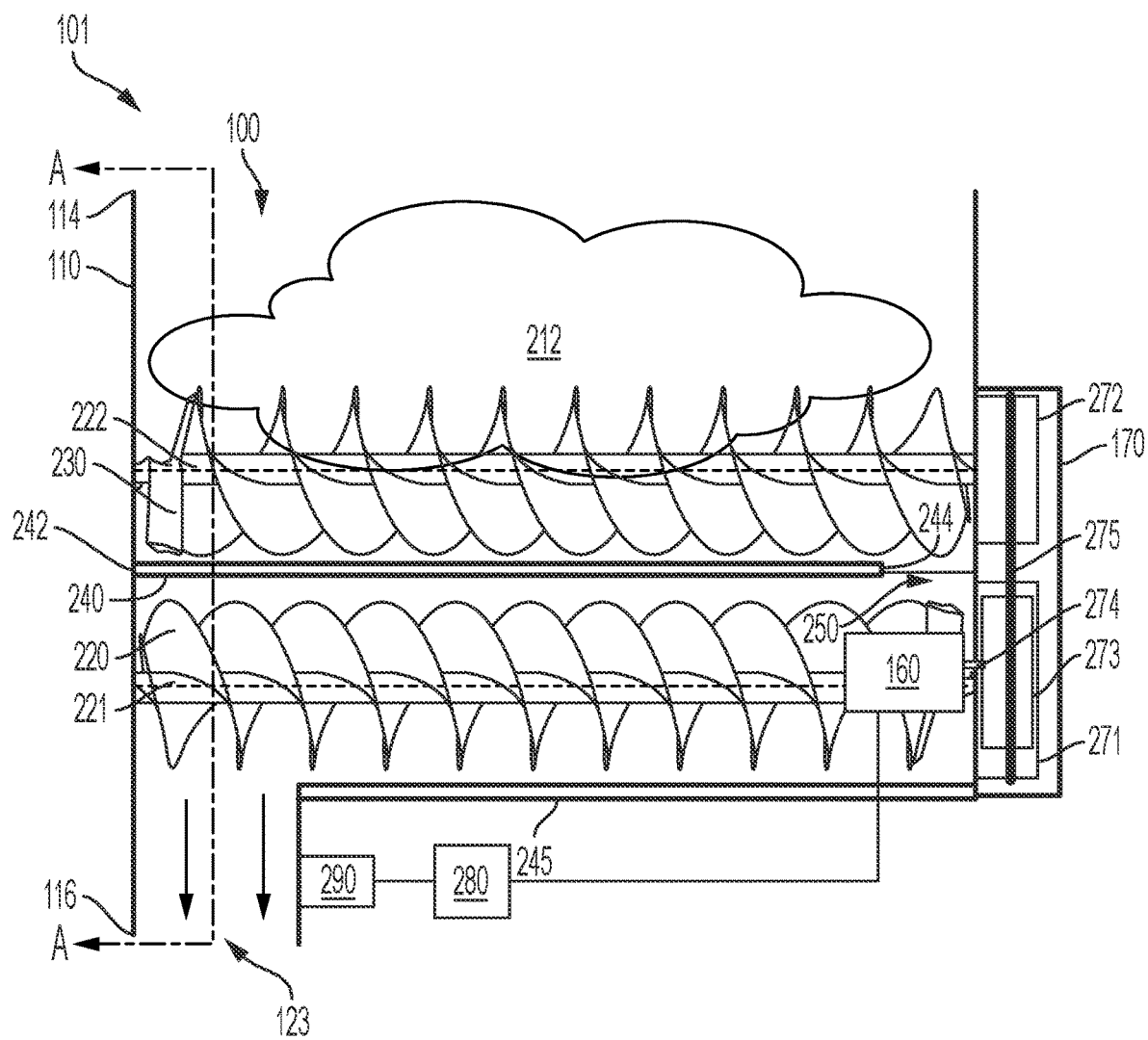
FIG. 2 illustrates a side cut-view of the double auger metering apparatus shown in FIG. 1, with a bulk material disposed therein.
Figure 3:
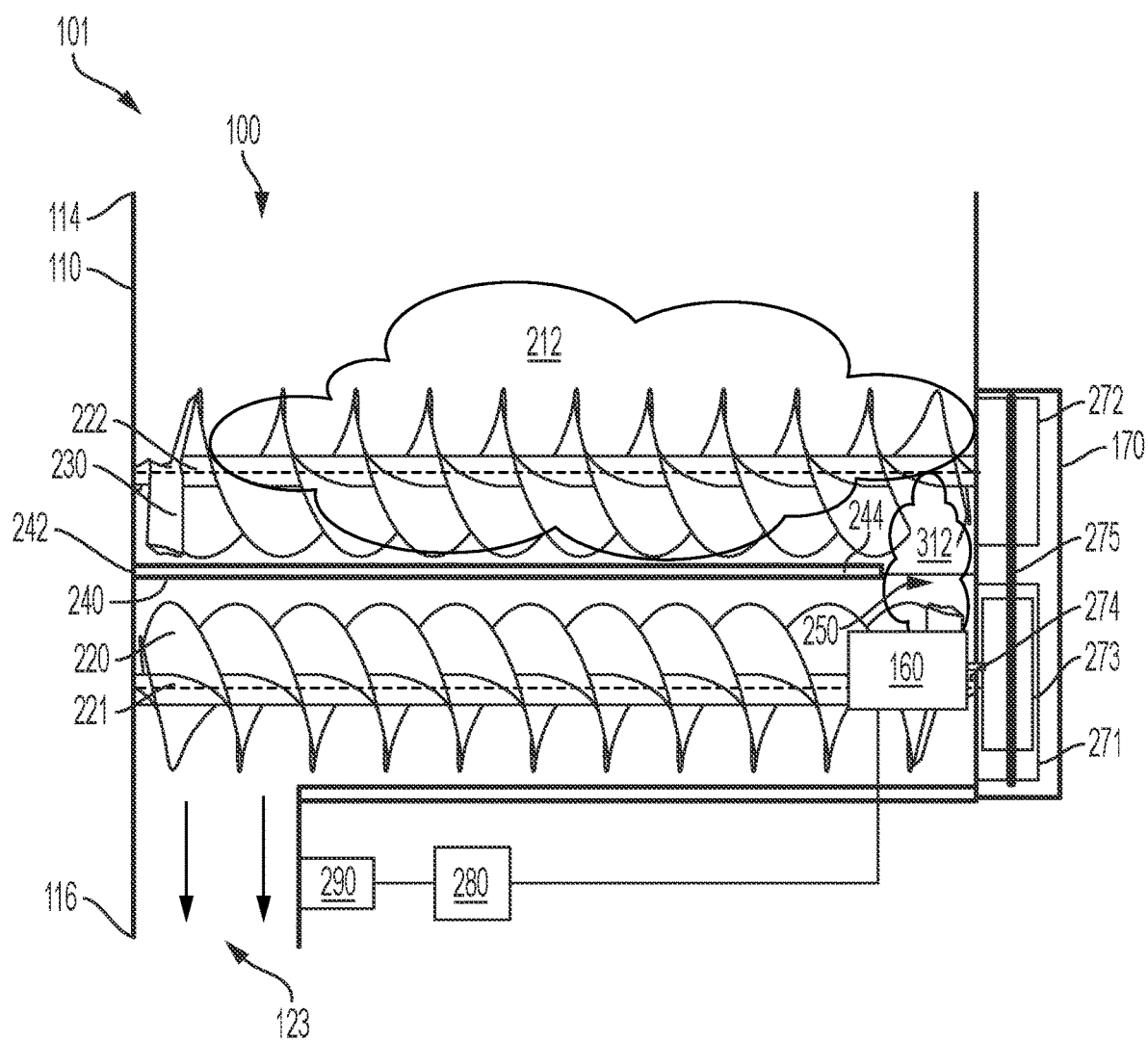
FIG. 3 illustrates another side cut-view of the double auger metering apparatus shown in FIG. 1, with the bulk material shown moving along a path formed by a first auger and a second auger.

During operation of the double auger metering apparatus 100, the bulk material 212 is typically placed into the hopper housing 110, such as with placement of a bulk material bag 1110 holding the bulk material 212 into the hopper housing 110, such as at the first end 114 of the hopper housing 110. The bulk material 212 is shown in FIG. 2 in its beginning location within the hopper housing 110 before the motor 260 is activated to move the bulk material 212. This beginning location includes the bulk material 212 being disposed atop the second auger 230, as shown in FIG. 2. Once the motor 260 is activated to rotate the first and second augers 220/230 and to move the bulk material 212 from atop the second auger 230, the bulk material 212 is pulled down into the rotating second auger 230, the rotating second auger 230 also moving the bulk material 212 along the path to the discharge opening 123 to the right, with a portion 312 of this bulk material 212 being pushed into the panel opening 250, as shown in FIG. 3.

Figure 4:
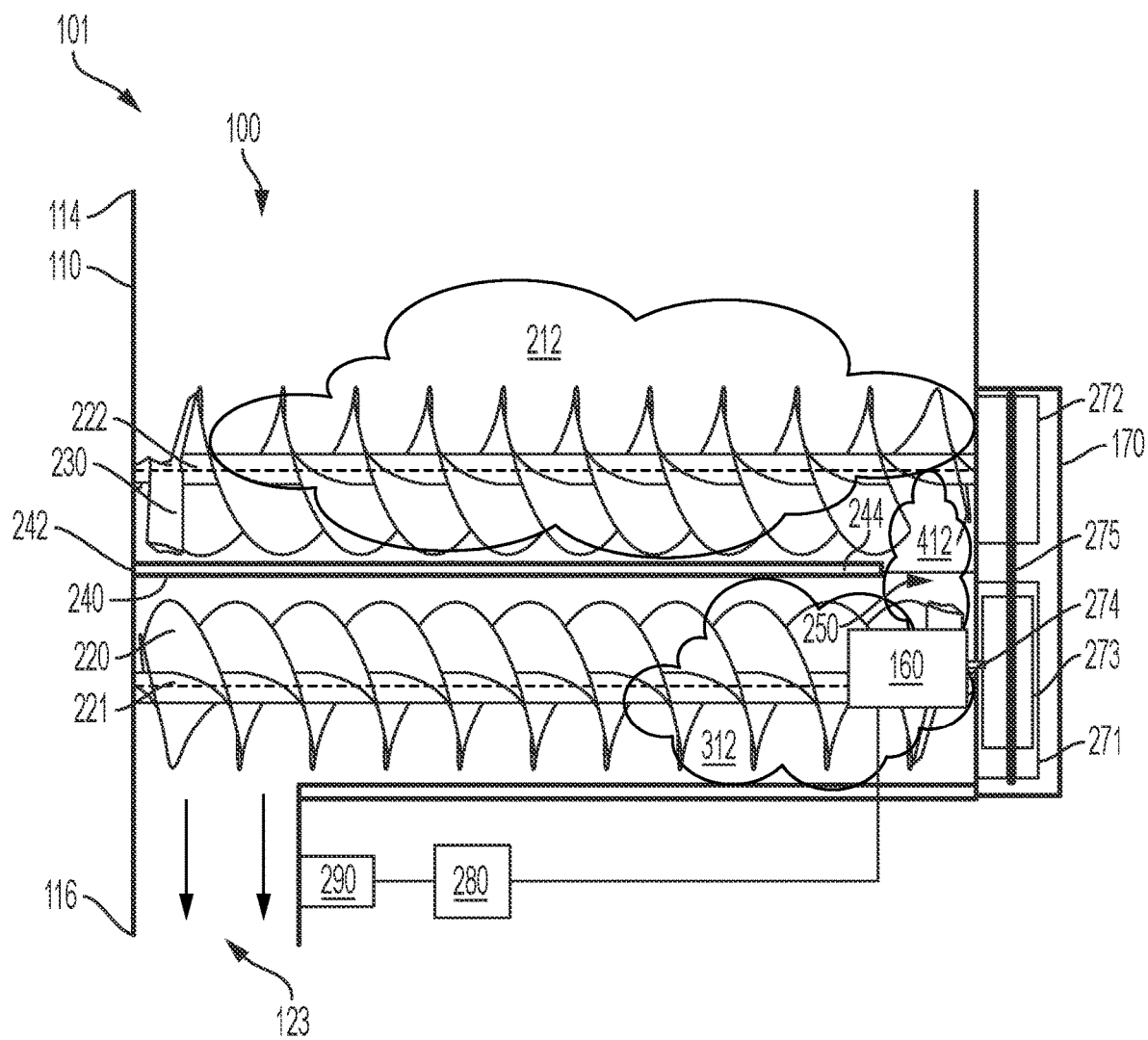
FIG. 4 illustrates another side cut-view of the double auger metering apparatus shown in FIG. 1, with the bulk material shown moving further along the path formed by the first auger and the second auger.
Figure 5:
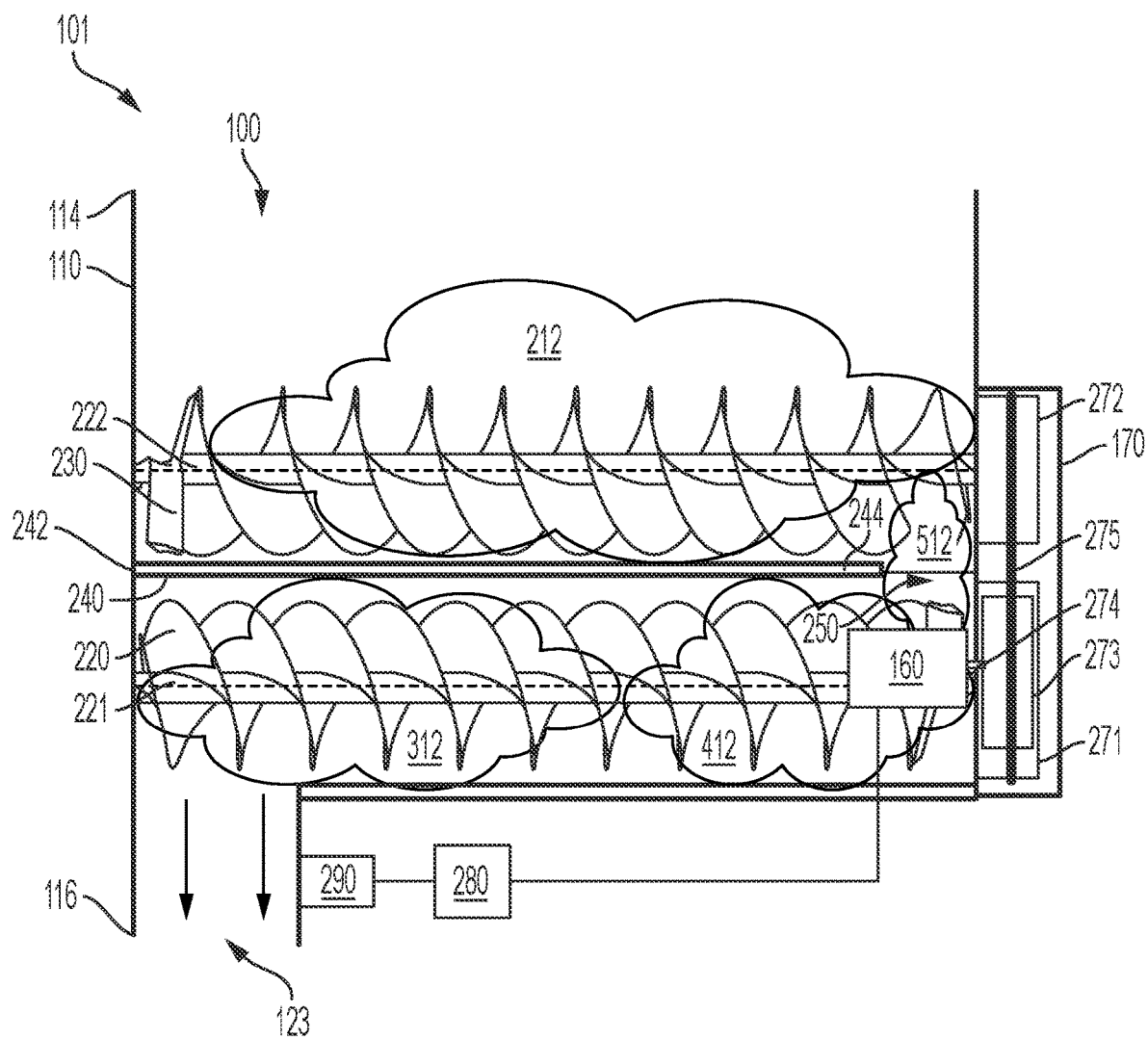
FIG. 5 illustrates another side cut-view of the double auger metering apparatus shown in FIG. 1, with the bulk material shown moving even further along the path formed by the first auger and the second auger.

The continued operation of the double auger metering apparatus 100 is shown in FIG. 4. The portion 312 of the bulk material 212 that was pushed into the panel opening 250, shown in FIG. 3, continues along the path to the discharge opening 123 with the portion 312 being pulled into the rotating first auger 220, as shown in FIG. 4. Simultaneously, as the portion 312 is being pulled into the rotating first auger 220, the rotating second auger 230 continues to move the bulk material 212 to the right and push another portion 412 of the bulk material 212 into the panel opening 250. The operation of the double auger metering apparatus 100 continues, as shown in FIG. 5. The portion 312 of the bulk material 212 that was pulled into the rotating first auger 220, shown in FIG. 4, continues along the path to the discharge opening 123 with the portion 312 being pushed by the rotating first auger 220 to the left, as shown in FIG. 5. Simultaneously, as the portion 312 is being pushed by the rotating first auger 220 to the left, the rotating first auger 220 also pulls the portion 412 of the bulk material 212 from the panel opening 250 into the rotating first auger 220, with the rotating second auger 230 continuing to move the bulk material 212 to the right and push another portion 512 of the bulk material 212 into the panel opening 250.

Figure 6:
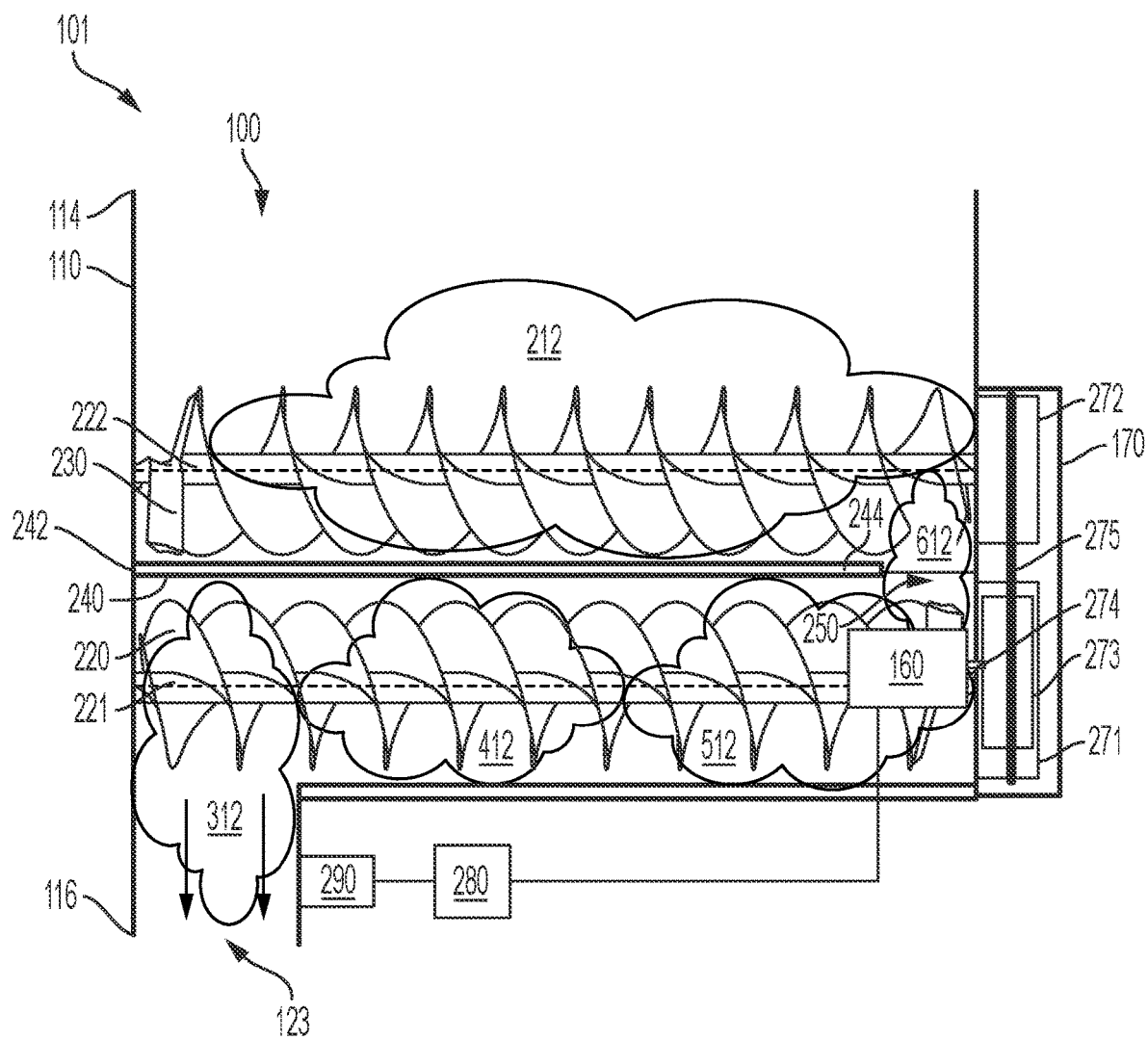
FIG. 6 illustrates another side cut-view of the double auger metering apparatus shown in FIG. 1, with the bulk material shown moving yet even further along the path formed by the first auger and the second auger.

The double auger metering apparatus 100 continues to operate, as shown in FIG. 6. The portion 312 of the bulk material 212 that was pulled into the rotating first auger 220 and pushed to the left, shown in FIGS. 4 and 5, continues along the path into the discharge opening 123. Simultaneously, as the portion 312 is being pushed into the discharge opening 123, the rotating first auger 220 also pushes the portion 412 to the left and pulls the portion 512 into the rotating first auger 220, with the rotating second auger 230 continuing to move the bulk material 212 to the right and push another portion 612 into the panel opening 250. Lastly, the rotating first auger 220 pushes the potion 312 into the discharge opening 123, as shown in FIG. 6. Operation of the double auger metering apparatus 100 to move the bulk material 212 along the path to the discharge opening 123 continues, as shown in FIGS. 3-6, until the motor 160 is deactivated or the hopper housing 110 is depleted of the bulk material 212.

Figure 7:
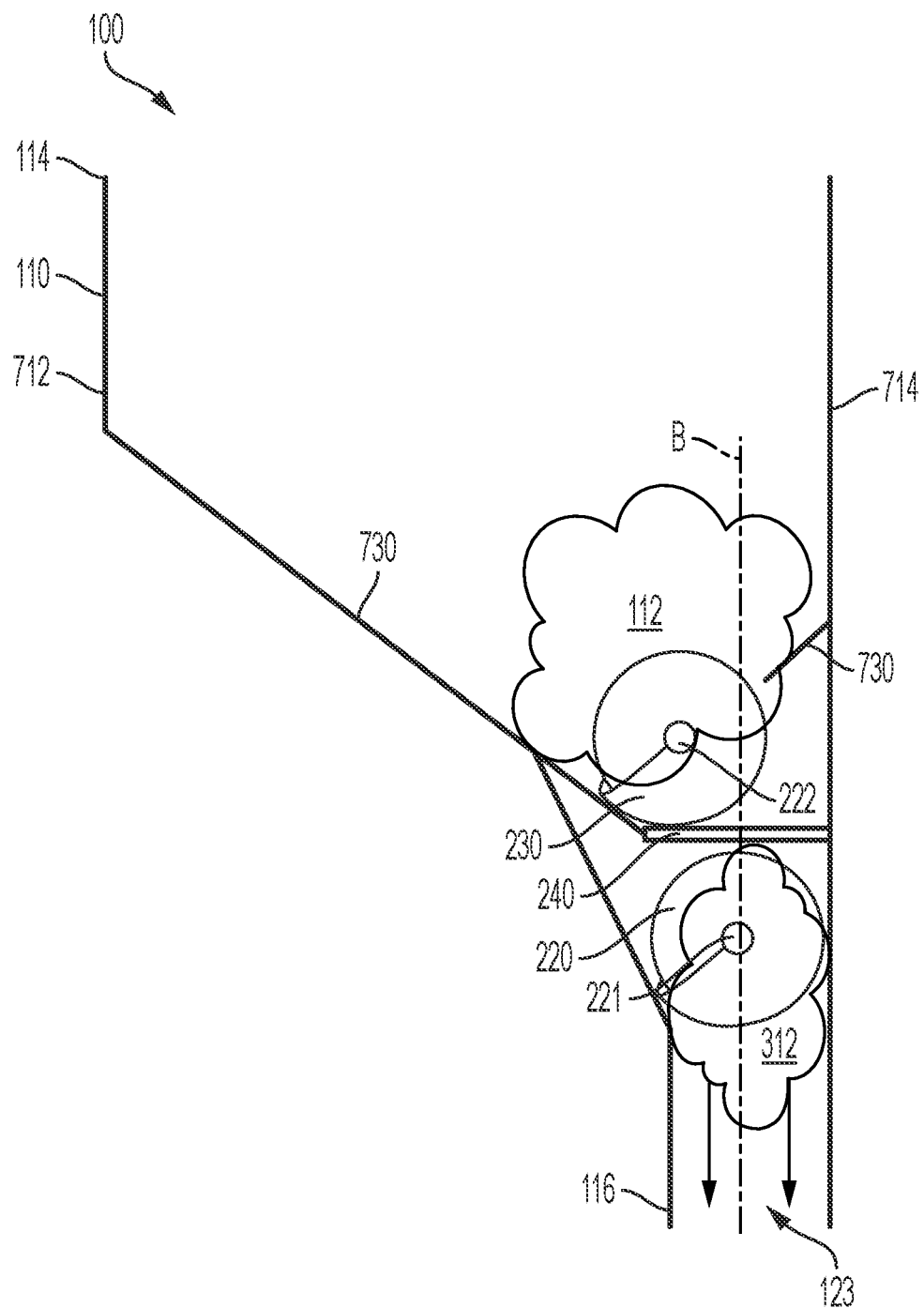
FIG. 7 illustrates another side cut-view of the double auger metering apparatus shown in FIG. 1 along cut line A-A shown in FIG. 2, with the bulk material disposed therein as shown according to FIG. 6.

As shown in FIG. 7, the hopper housing 110 further includes a first side 712 and a second side 714, with the second auger 230 being disposed proximate to the second side 714. In at least one embodiment, the hopper housing 110 further comprises a slanted panel 720 slanted downward from the first side 712 toward the second side 714 to direct the bulk material 212 toward the second auger 230, such as via gravity. In at least one embodiment, the hopper housing 110 further comprises another slanted panel, such slanted panel 730 that is coupled to the second side 714 and slanted toward the second auger 230 to direct the bulk material 212 toward the second auger 230, such as via gravity.

Figure 11:
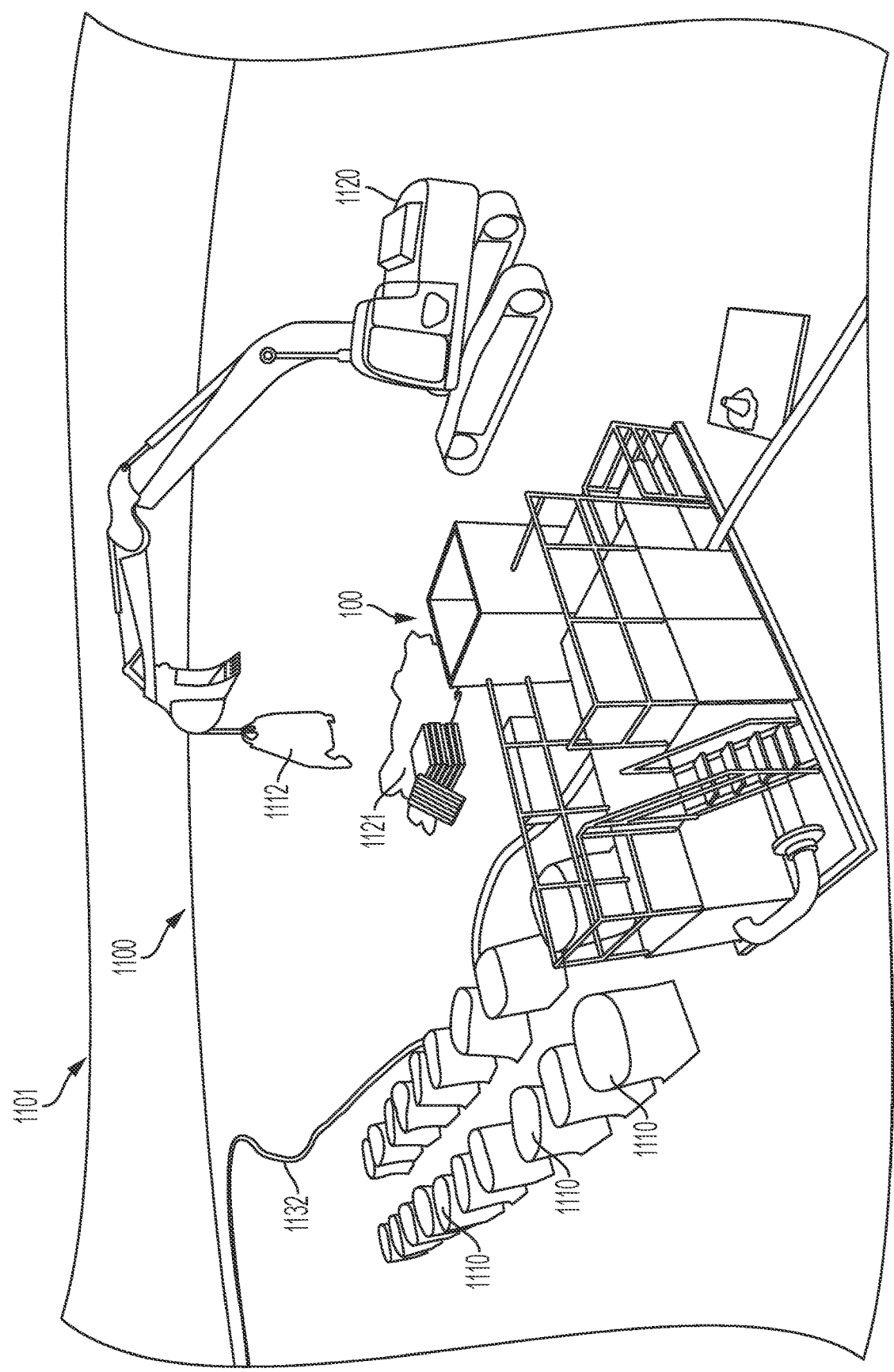
FIG. 11 illustrates another example system including an example stationary mixing station utilizing the double auger metering apparatus shown in FIG. 1.

In at least one embodiment, the first auger 220 is approximately (+−7%) in-line with the discharge opening 123 and the second auger 230 is offset with respect to the discharge opening 123. In other embodiments, the first auger 220 and the second auger 230 are in-line with respect to the discharge opening 123. In at least one embodiment, the double auger metering apparatus 100 includes one or more support rings 168 coupled to the hopper housing 110, such as on an outside surface of the first side 712, as shown. The support ring(s) 712 can be used to lift and move the double auger metering apparatus 100, such as with an excavator 1120 (FIG. 11).

Figure 8:
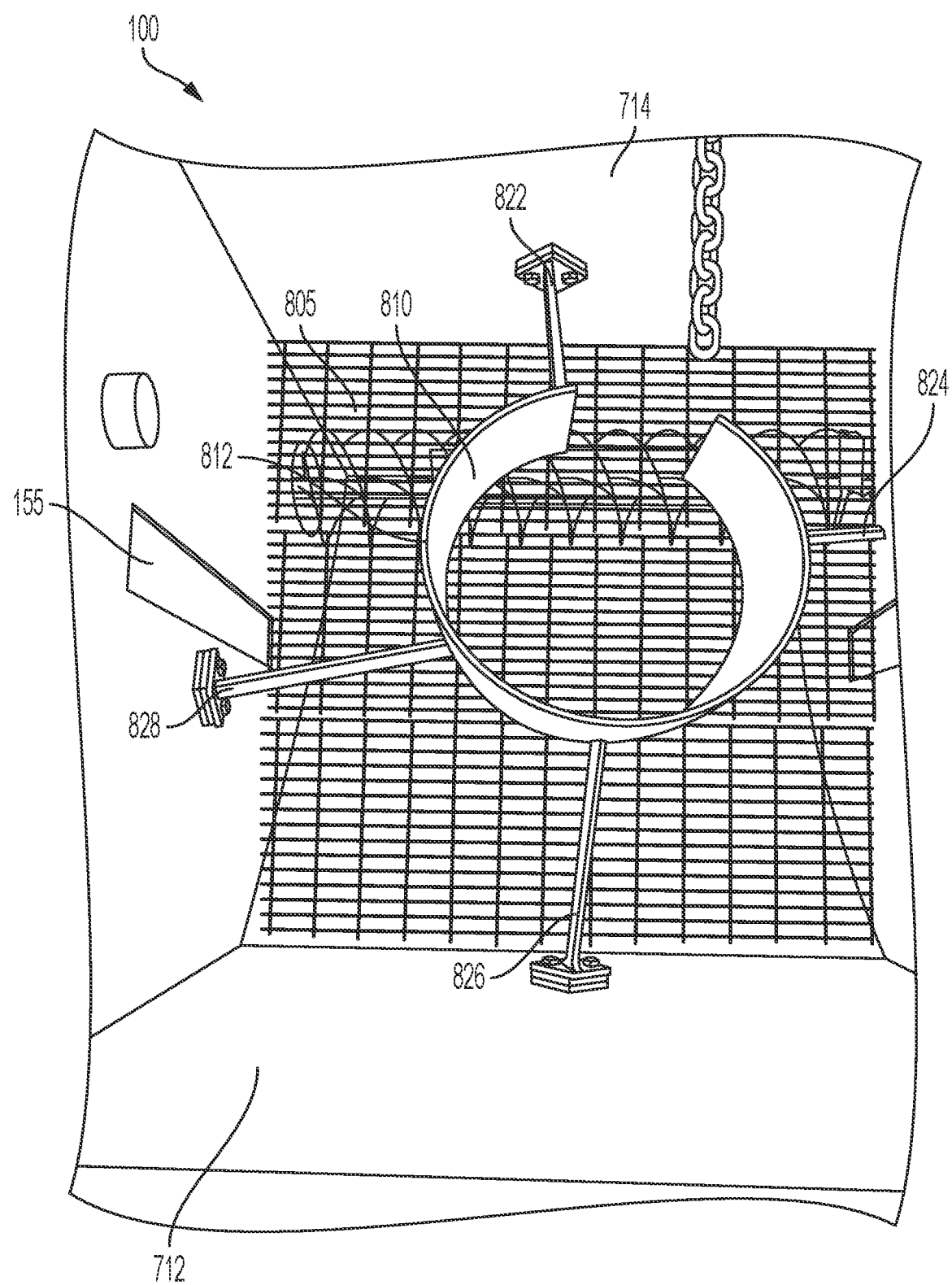
FIG. 8 illustrates a top-down view of the double auger metering apparatus of the present disclosure shown in FIG. 1, as looking down into a hopper housing.

In at least one embodiment, as shown in FIG. 8, the double auger metering apparatus 100 further includes a grate 805 disposed between the first end 114 of the hopper housing 110 and the second auger 230. In at last one embodiment, the grate 805 is substantially (+−7%) a same dimension as the first end 114 of the hopper housing 110. In other embodiments, the grate 805 is a different dimension than the first end 114 of the hopper housing 110, such as smaller than the first end 114 of the hopper housing 110.

In at least one embodiment, a bag-stop 810 is disposed proximate to the first end 114 of the hopper housing 110. This bag-stop 810 punctures a bulk material bag 1110 (FIG. 11) storing the bulk material 212 that is placed into the hopper housing 110. This puncture allows the bulk material 212 to fall into the second auger 230. In at least one embodiment, the bag-stop 810 includes a crescent shaped member 812 coupled to the hopper housing 110 via bracing members, such as four bracing members 822/824/826/828 disposed around a perimeter of the crescent shaped member 812.

Figure 9:
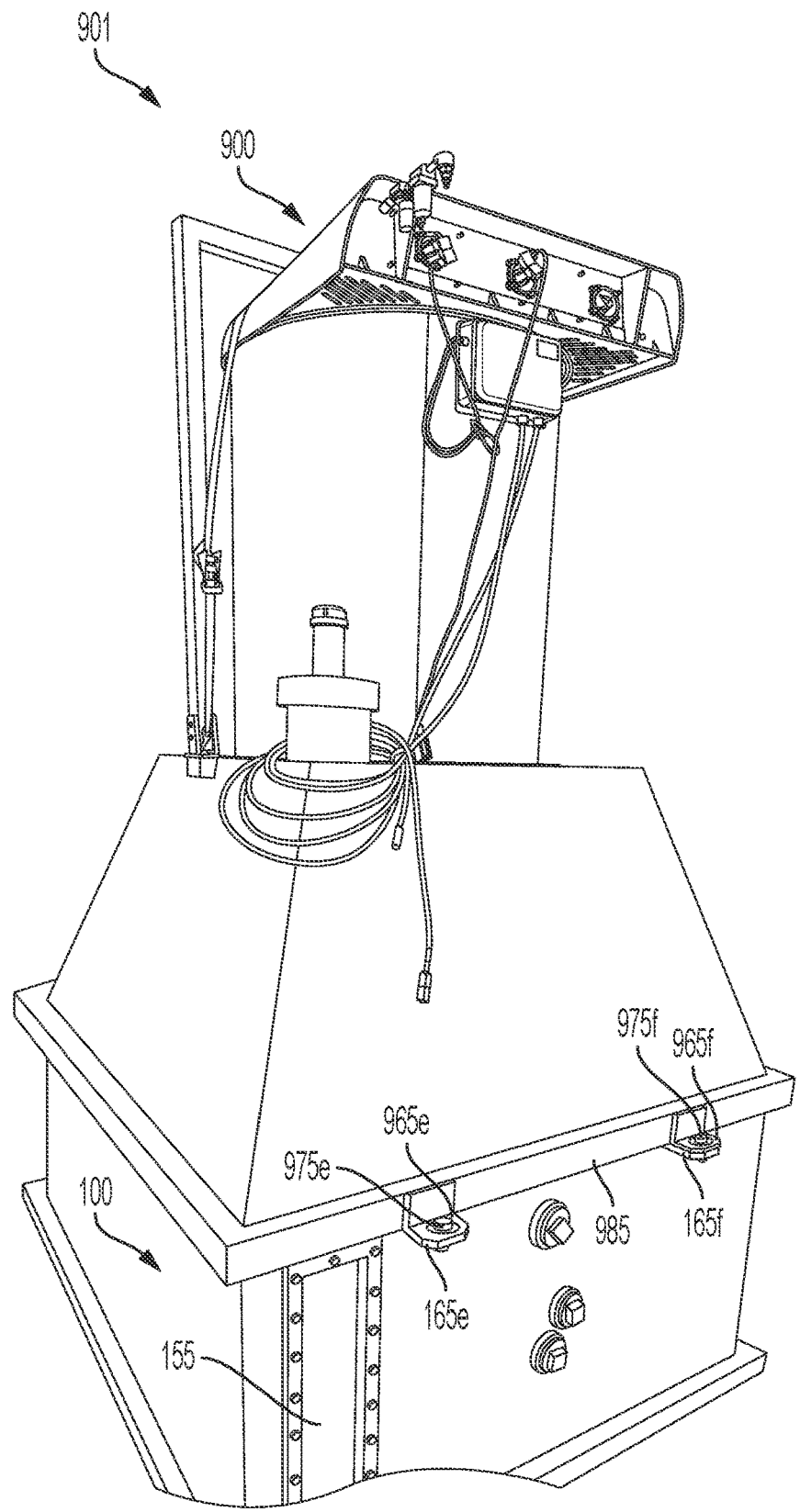
FIG. 9 illustrates an example pressurizing apparatus that is utilized with the double auger metering apparatus shown in FIG. 1.

In some scenarios, it is beneficial to positively pressurize the inside of the hopper housing 110 to assist in moving the bulk material 212 to the discharge opening 123. An example system 901 includes the double auger metering apparatus 100 and further comprises a pressurizing apparatus 900, as shown in FIG. 9. The pressurizing apparatus 900 positively pressurizes the hopper housing 110 to push the bulk material 212 along the path that includes pushing the bulk material 212 into the second auger 230.

The pressurizing apparatus 900 includes mounting tabs 965e and 965f that are disposed along a perimeter of a bottom of the pressurizing apparatus 900, as shown. These mounting tabs 965e and 965f correspond to mounting tabs 165 that are disposed around a perimeter of the first end 114 of the hopper housing, such as mounting tabs 165a/165b/165c/165d shown in FIG. 1. Although only four mounting tabs 165 are shown, the double auger metering apparatus 100 can utilize two mounting tabs 165 on each side of the first end 114 of the hopper housing 110. A fastener, such as a nut and bolt 975e/975f, are used to couple the mounting tabs 965e/965f to mounting tabs 165e/165f, respectively. In some embodiments, a gasket 985, such as a rubber seal, is disposed between the pressurizing apparatus 900 and the double auger metering apparatus 100 to maintain pressure within the hopper housing 110.

Figure 10:
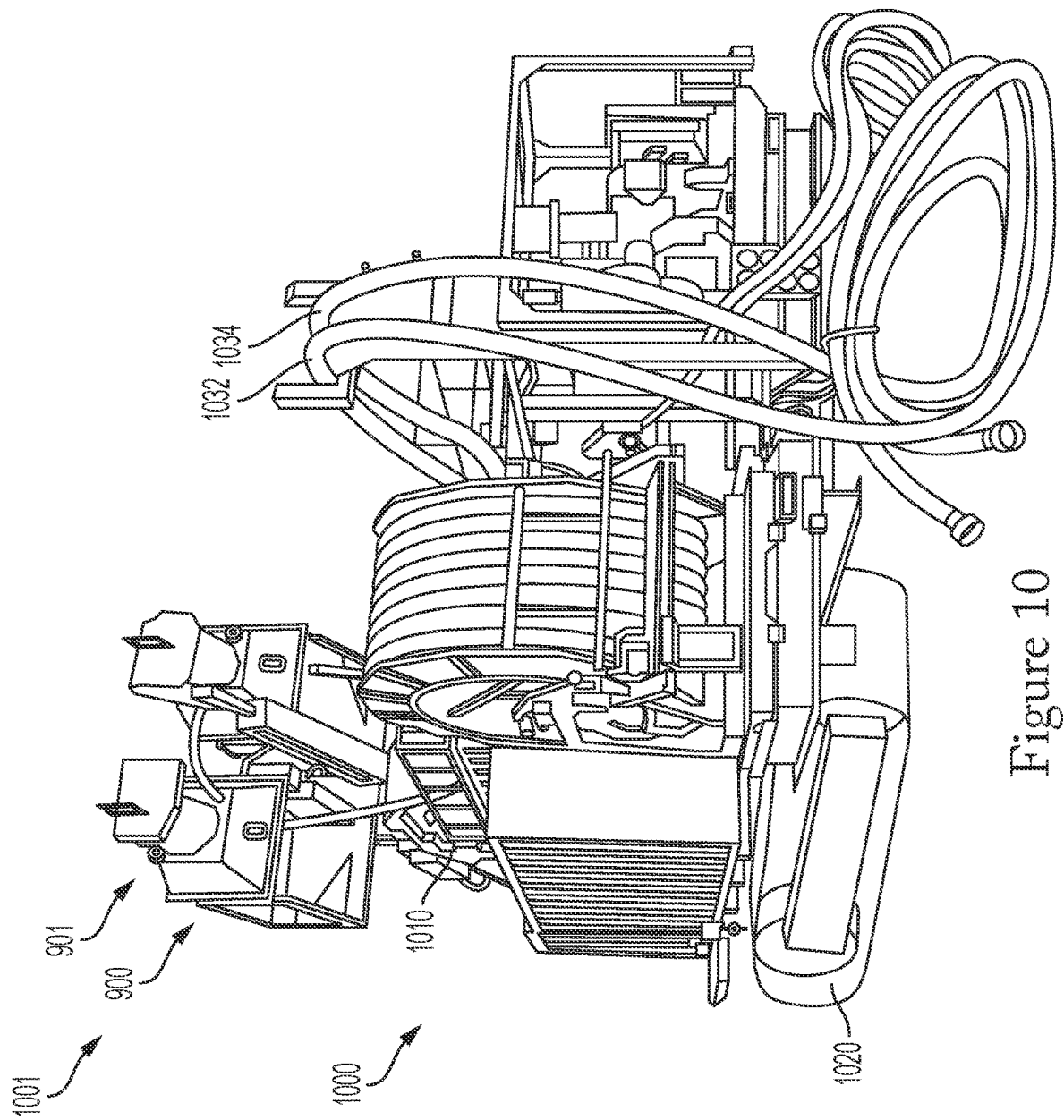
FIG. 10 illustrates an example system including an example mobile mixing station utilizing two of the double auger metering apparatus shown in FIG. 1.
Figure 12:
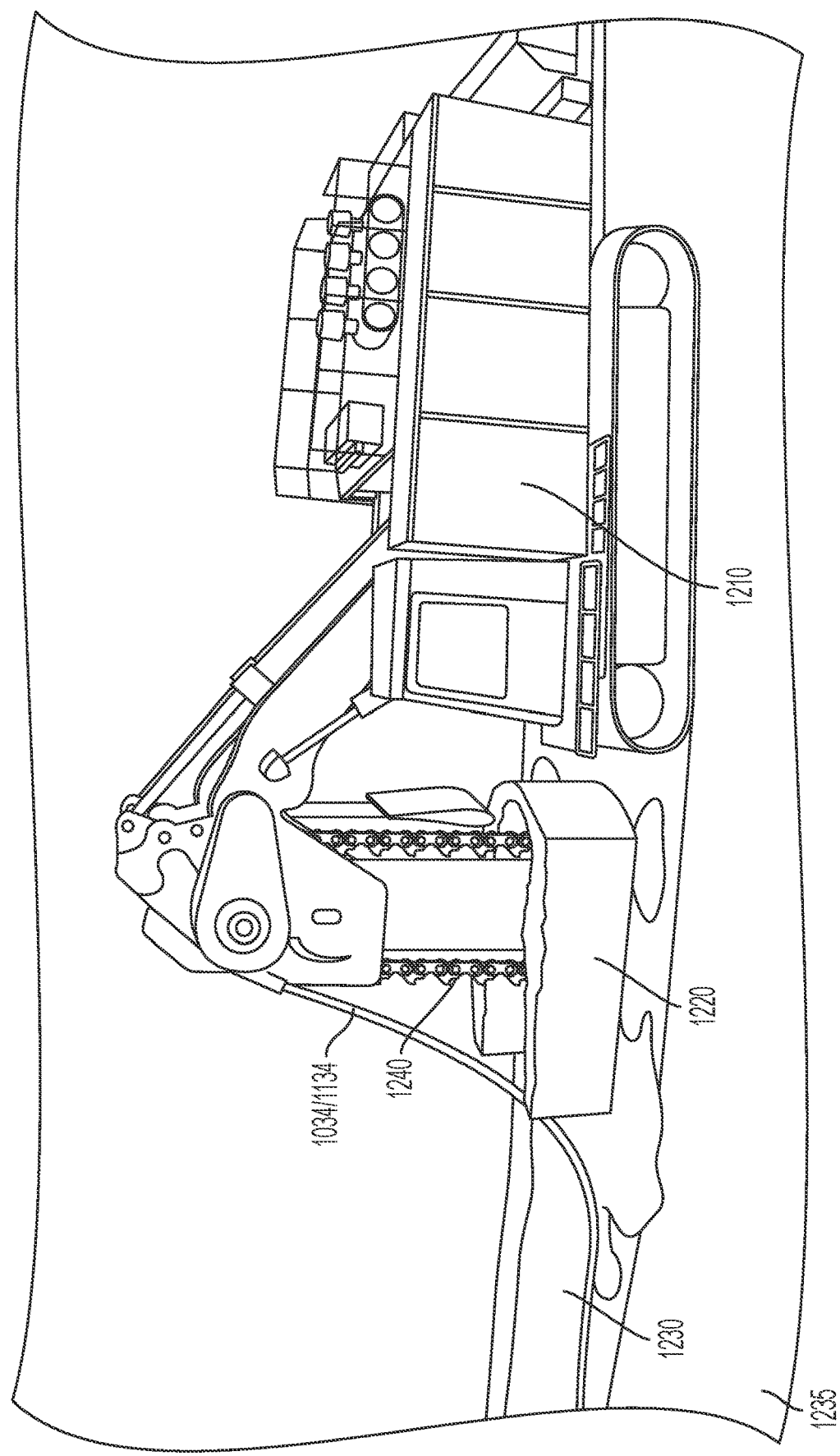
FIG. 12 illustrates an example trencher that is used in combination with at least one of the mobile mixing station and the stationary mixing station shown in FIGS. 10 and 11, respectively.

In some scenarios, a volume of bulk material 212 that exits the discharge opening 123 for a single double auger metering apparatus 100 is inadequate. In addition, in some scenarios the bulk material 212 is utilized at various locations on a worksite. As shown in FIG. 10, a system 1001 includes a mobile mixing station 1000. In at least one embodiment, the mobile mixing station 1000 includes two double auger metering apparatuses 100 to double a volume of the available bulk material 212 available to an apparatus utilizing the bulk material 212, such as a trencher 1210 (FIG. 12). The mixing station 1000 includes an auger mount 1010 onto which the two double auger metering apparatuses 100 are coupled. In at least one embodiment, to traverse rough terrain on a worksite the mixing station 1000 includes tracks 1020.

The mixing station further includes a first hose 1032 and a second hose 1034, each coupled to the mixing station 1000. In at least one embodiment, the first hose 1032 is used to receive a mixing agent, such as water, at the mixing station 1000. The mixing station 1000 mixes this mixing agent with the bulk material 212, with the second hose 1034 being used to deliver this mixture of the mixing agent and the bulk material 212 to an apparatus utilizing this mixture of the mixing agent and bulk material 212, such as to the trencher 1210. The mixing station 1000 pumps this mixed combination of mixing agent/bulk material 212 to the trencher 1210.

FIG. 11 illustrates another type of mixing station 1100. This mixing station 1100 is typically placed on a worksite and remains in a stationary location for an extended period of time (e.g., hours to days). A system 1101 includes the mixing station 1100, with the mixing station 1100 in this embodiment utilizing a single double auger metering apparatus 100. As shown, a plurality of the bulk material bag 1110 are placed in rows for easy access by the excavator 1120. The excavator 1120 picks up and places the bulk material bags 1110, one at a time, into the hopper housing 110. As shown, the excavator 1120 deposits the bulk material 212 into the hopper housing 110, and the excavator 1120 discards a bag material 1112 (e.g., plastic) onto a discard pile 1121 to be removed from the worksite.

The system 1101 further includes a first hose 1132 and a second hose 1134, each coupled to the mixing station 1100. As with the mixing station 1000, in at least one embodiment, the first hose 1132 is used to receive a mixing agent, such as water, at the mixing station 1100. The mixing station 1100 mixes this mixing agent with the bulk material 212, with the second hose 1134 being is used to deliver a mixture of the mixing agent and the bulk material 212 to an apparatus utilizing this mixed combination mixing agent/bulk material 212, such as to the trencher 1210. The mixing station 1100 pumps this mixture of the mixing agent and the bulk material 212 to the trencher 1210.

FIG. 12 illustrates the trencher 1210 in the process of installing a trench 1230 within a farm field. In at least one embodiment, to prevent splashing a splash shield 1220 is utilized, as shown. The splash shield 1220 encircles the trenching mechanism 1240 to keep the mixture of the mixing agent and the bulk material 212 from splashing outside a proximity of the trenching mechanism 1240. In at least one embodiment, a system 1201 can include the trencher 1210 to dig a trench 1230 along a soil 1235 into which the bulk material 212 is added to the soil 1235. The trencher 1210 can receive, via the second hose 1034/1134, the mixture of the mixing agent and the bulk material 212 produced by at least one of the mixing stations 1000/1100, respectively.

Figure 13:
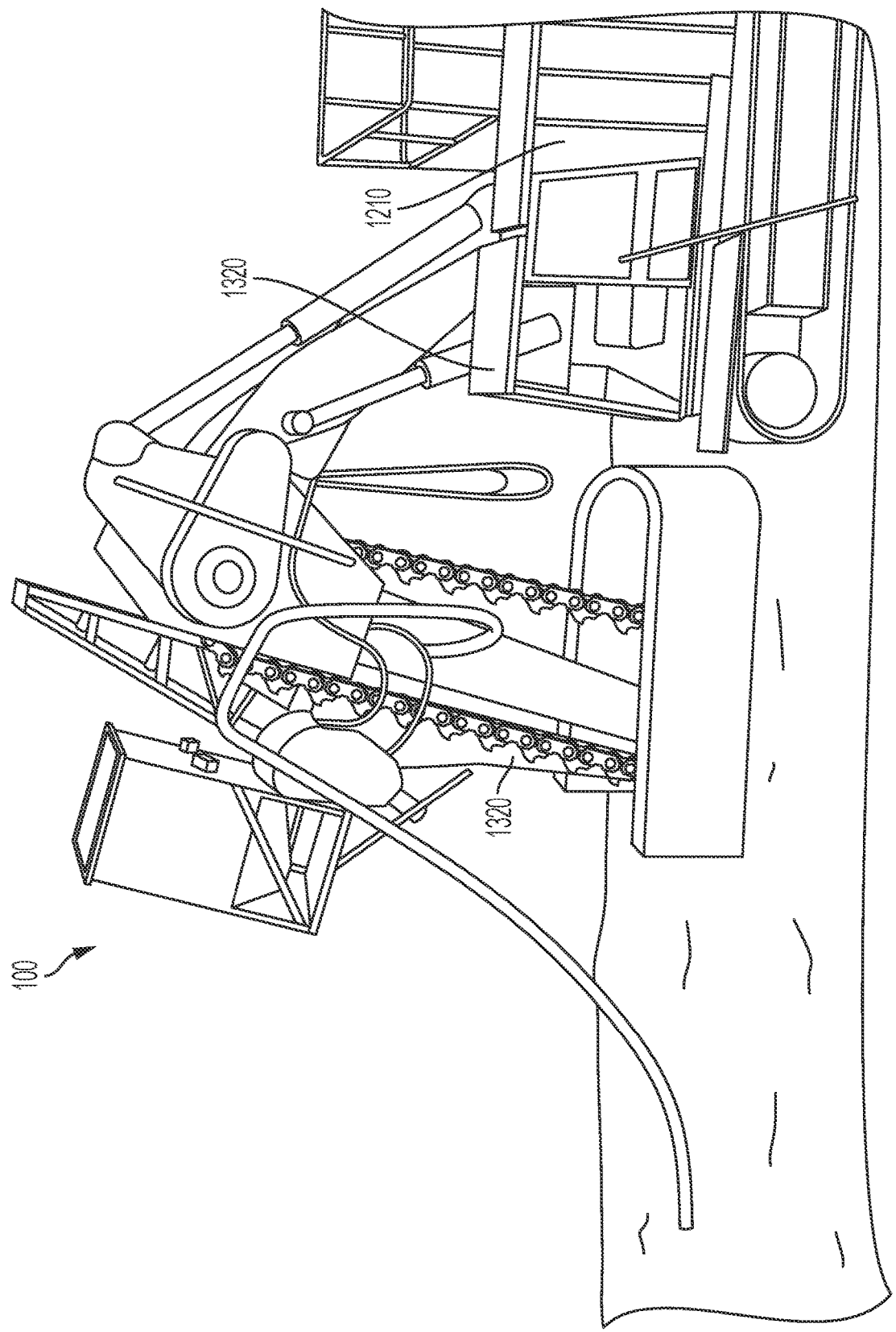
FIG. 13 illustrates another example trencher utilizing the double auger metering apparatus shown in FIG. 1 coupled to a front of the trencher.

FIG. 13 illustrates another system 1301 that includes the double auger metering apparatus 100 coupled a trencher 1310, such as proximate to a front 1312 (e.g., on side of the trencher 1310 including an operator's controls) of the trencher 1310, the front 1312 also being proximate to the blades 1320 of the trencher 1310. The trenchers 1210/1310 are shown installing a groundwater barrier or a soil Bentonite cutoff wall. This type of barrier prevents groundwater from being able to flow past a location in which the barrier has been installed.

The trencher 1210/1310 can be of the type developed by DeWind Corporation. The trencher 1210 can be of the type that uses one-pass trenching technology, such as model MT2000 or MT3500. These trenchers install various types of systems deeper, faster, safer, and at less cost than most conventional alternatives. The MT 3500 (e.g., with up to 3,500 horse power) can reach depths of up to 125' feet below grade for "Mix In Place" walls, such as soil Bentonite Walls, and soil cement Bentonite wall installations. These one-pass trenchers can mixed-in-place soil Bentonite and soil, cement Bentonite into a completely homogenized wall from top to bottom and from start to finish. These one-pass trenchers utilize a continuous vertical mixing that eliminates possibility for window or voids in the wall. One-pass barrier walls are evenly and consistently mixed throughout. These one-pass trenchers can mix a heavy high slump mix in place. This ability to mix a super heavy slump makes one-pass ideal for dam and levee repair. The double auger metering apparatus 100 can be used as a metered Bentonite delivery system.

These one-pass trenchers can use underground water injection nozzles, pre-mixed slurry injection ports, speed controls for both the mixing chain and track speeds, GPS mapping and laser guides to control depth. Engineers who use these one-pass trenchers prefer them to conventional excavator installation methods because of the completely homogenized soils from top to bottom, secure key into confining layer, no possibility for voids in the wall, precise laser installations, no messing mixing ponds, ability to work in tight sites, no open excavation and fast installation rates with a precise mapping of the alignment for future use. These one-pass trenchers can build trenches that are 125'+ deep, are 12"-48" wide, and can build 200-500 linear feet per day.

In at least one embodiment, the bulk material 212 can be comprised of Bentonite which is an absorbent aluminium phyllosilicate clay consisting mostly of montmorillonite. It was named by Wilbur C. Knight in 1898 after the Cretaceous Benton Shale near Rock River, Wyo. The different types of Bentonite are each named after the respective dominant element, such as potassium (K), sodium (Na), calcium (Ca), and aluminium (Al). Bentonite usually forms from weathering of volcanic ash, most often in the presence of water. However, the term Bentonite, as well as a similar clay called tonstein, has been used to describe clay beds of uncertain origin. For industrial purposes, two main classes of Bentonite exist: sodium and calcium Bentonite. In stratigraphy and tephrochronology, completely devitrified (weathered volcanic glass) ash-fall beds are commonly referred to as K-Bentonites when the dominant clay species is illite. In addition to montmorillonite and illite, another common clay species that is sometimes dominant is kaolinite. Kaolinite-dominated clays are commonly referred to as tonsteins and are typically associated with coal.

The property of swelling on contact with water makes sodium Bentonite useful as a sealant, since it provides a self-sealing, low-permeability barrier. It is used to line the base of landfills to prevent migration of leachate, for quarantining metal pollutants of groundwater, and for the sealing of subsurface disposal systems for spent nuclear fuel.[10] Similar uses include making slurry walls, waterproofing of below-grade walls, and forming other impermeable barriers, e.g., to seal off the annulus of a water well, to plug old wells.

Bentonite can also be "sandwiched" between synthetic materials to create geosynthetic clay liners (GCLs) for the aforementioned purposes. This technique allows for more convenient transport and installation, and it greatly reduces the volume of bentonite required. It is also used to form a barrier around newly planted trees to constrain root growth so as to prevent damage to nearby pipes, footpaths and other infrastructure. Farmers use bentonite to seal retention ponds and line canals.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:
1. An apparatus, comprising:
 a hopper housing to hold a bulk material, the hopper housing including a first end at which the bulk material is added to the hopper housing and a second end comprising a discharge opening at which the bulk material exits the hopper housing;
 a first auger disposed proximate to the discharge opening;
 a second auger disposed between the first end of the hopper housing and the first auger, the second auger being substantially parallel to the first auger, wherein the second auger is fed bulk material exclusively from the hopper housing;
 a dividing panel including a first side and a second side, with the dividing panel being parallel and disposed between the first auger and the second auger and the dividing panel being coupled to the hopper housing at the first side thereof and forming a panel opening between the hopper housing and the second side thereof;
 a bottom panel parallel to the first auger being coupled to the hopper housing forming the discharge opening being disposed opposite of the second auger from the dividing panel; and a motor to rotate the first auger and the second auger, with the bulk material being moved by the rotating second auger into the panel opening and the bulk material being moved by the rotating first auger into the discharge opening of the hopper housing.

2. The apparatus according to claim 1, further comprising a transmission coupled to the first auger and the second auger, the transmission transferring a torque produced by the motor to the first auger and the second auger.

3. The apparatus according to claim 2, wherein the transmission includes a first toothed sprocket coupled to the first auger, a second toothed sprocket coupled to the second auger, a third toothed sprocket coupled to a drive shaft of the motor, and a chain coupled to the first toothed sprocket, the second toothed sprocket, and the third toothed sprocket.

4. The apparatus according to claim 1, further comprising a grate disposed between the first end of the hopper housing and the second auger, the grate being substantially a same dimension as the first end of the hopper housing.

5. The apparatus 100 according to claim 1, wherein the first end and second end are polygonal in shape.

6. The apparatus according to claim 5, wherein the polygonal shape is a square.

7. The apparatus according to claim 1, further comprising a bag-stop disposed proximate to the first end of the hopper housing, the bag-stop to puncture a bulk material bag storing the bulk material placed into the hopper housing, the puncture to allow the bulk material to fall into the second auger.

8. The apparatus according to claim 7, wherein the bag-stop includes a crescent shaped member coupled to the hopper housing via four bracing members disposed around a perimeter of the crescent shaped member.

9. The apparatus according to claim 1, wherein the hopper housing further includes a first side and a second side, the second auger being disposed proximate to the second side and the hopper housing further comprising a slanted panel slanted downward from the first side toward the second side to direct the bulk material toward the second auger.

10. The apparatus according to claim 1, wherein the hopper housing further includes a first side and a second side, the second auger being disposed proximate to the second side and the hopper housing further comprising a slanted panel coupled to the second side and slanted toward the second auger to direct the bulk material toward the second auger.

11. The apparatus according to claim 1, further comprising a volume-window disposed within the hopper housing, the volume-window to allow for a visual determination of the volume of the bulk material contained within the hopper housing.

12. The apparatus according to claim 1, further comprising a frame coupled to the hopper housing, the frame supporting the hopper housing to stand in an upright orientation on the second end.

13. The apparatus according to claim 1, further comprising a plurality of mounting tabs disposed along a perimeter of the first end.

14. The apparatus according to claim 1, wherein the first auger is approximately in-line with the discharge opening and the second auger is offset with respect to the discharge opening.

15. The apparatus 100 according to claim 1, wherein the bulk material is comprised of Bentonite.

16. A system comprising the apparatus according to claim 1, the system further comprising a feeder controller coupled to the motor and a discharge sensor disposed proximate to the discharge opening and coupled to the hopper housing, the discharge sensor sensing a volume of the bulk material exiting the hopper housing and the feeder controller controlling a speed at which the motor turns the first auger and the second auger based on the sensed volume of the bulk material exiting the hopper housing to control the volume of the bulk material exiting the discharge opening of the hopper housing.

17. A system comprising the apparatus according to claim 1, the system further comprising a pressurizing apparatus to positively pressurize the hopper housing to push the bulk material into the second auger.

18. A system comprising the apparatus according to claim 1, the system further comprising a trencher to dig a trench along a soil into which the bulk material is added to the soil.

19. The system according to claim 18, wherein the apparatus is coupled to a front of the trencher proximate to blades of the trencher.

20. A system comprising the apparatus according to claim 1, the system further comprising a mixing station including a first hose and a second hose, the first hose to receive a mixing agent by the mixing station and the second hose to deliver a mixture of the bulk material and the mixing agent to a trencher.

* * * * *